United States Patent [19]

Allen et al.

[11] Patent Number: 5,214,088
[45] Date of Patent: May 25, 1993

[54] HIGHLY DENSE THERMOPLASTIC MOLDING COMPOSITIONS

[75] Inventors: Joel D. Allen, Washington, W. Va.; Dennis W. Champlain, Mt. Vernon, Ind.; Richard J. Clark, Austin, Tex.; Lawrence R. Wallace, Johnson City, Tenn.

[73] Assignee: General Electric Company, Pittsfield, Mass.

[21] Appl. No.: 597,849

[22] Filed: Oct. 15, 1990

Related U.S. Application Data

[63] Continuation-in-part of Ser. No. 424,888, Oct. 20, 1989, abandoned, and a continuation-in-part of Ser. No. 640,021, Jan. 10, 1991, which is a continuation of Ser. No. 424,543, Oct. 20, 1989, abandoned.

[51] Int. Cl.$^5$ ................................................ C08K 3/10
[52] U.S. Cl. .................................... 524/413; 524/423; 524/432; 524/443
[58] Field of Search ................. 524/432, 423, 413, 443

[56] References Cited

U.S. PATENT DOCUMENTS

| | | | |
|---|---|---|---|
| 2,465,319 | 3/1949 | Whinfield et al. | 260/75 |
| 2,901,466 | 8/1959 | Kibler et al. | 260/75 |
| 3,023,192 | 2/1962 | Shivers, Jr. | 260/75 |
| 3,047,539 | 7/1962 | Pengilly | 260/75 |
| 3,651,014 | 3/1972 | Witsiepe | 260/75 |
| 3,763,109 | 10/1973 | Witsiepe | 260/75 |
| 3,766,146 | 10/1973 | Witsiepe | 260/75 |
| 3,784,520 | 1/1974 | Hoeschele | 260/75 |
| 3,801,507 | 4/1974 | Hoeschele | 260/75 |
| 4,022,748 | 5/1977 | Schlichting et al. | 524/452 |
| 4,043,971 | 8/1977 | Wurmb et al. | 524/601 |
| 4,156,774 | 5/1979 | Buxbaum et al. | 528/273 |
| 4,264,761 | 4/1981 | McGirk | 528/300 |
| 4,321,341 | 3/1982 | Neuberg et al. | 528/296 |
| 4,355,155 | 10/1982 | Nelson | 528/301 |
| 4,431,766 | 2/1984 | Christie et al. | 524/403 |
| 4,510,196 | 4/1985 | Carter, Jr. | 524/322 |
| 4,556,688 | 12/1985 | McCready et al. | 525/33 |
| 4,556,705 | 12/1985 | McCready | 524/101 |
| 4,639,486 | 1/1987 | Liu | 524/411 |
| 4,659,765 | 4/1987 | Liu et al. | 524/447 |
| 4,745,027 | 5/1988 | Maeda et al. | 524/423 |
| 4,752,630 | 6/1988 | Sterzel et al. | 524/497 |
| 4,760,112 | 7/1988 | McCready et al. | 525/33 |
| 4,891,397 | 1/1990 | Liu | 524/424 |
| 4,968,746 | 11/1990 | Deruddder et al. | 524/403 |

*Primary Examiner*—John C. Bleutge
*Assistant Examiner*—Mark Sweet

[57] ABSTRACT

Compositions comprising copolyetherester resins, copolyetherimide ester resins, or mixtures thereof, in combination with a high molecular weight polyester resin or mixture of such resins, with relatively high loadings of fillers selected from zinc oxide, barium sulfate, zirconium oxide, zirconium silicate, strontium sulfate or a mixture of any of such fillers, provide highly dense thermoplastic molded articles with properties suitable to replace ceramics and filled thermosets in many important applications.

3 Claims, No Drawings ns having high impact strength. Addition of the copolymers in combination with the such polyesters is also found to provide desirably lower Shore hardness, improved dynamic fatigue properties, paintability, extrudability and injection moldability. The new compositions can also contain reinforcing fillers and/or flame retardant agents.

HIGHLY DENSE THERMOPLASTIC MOLDING COMPOSITIONS

CROSS REFERENCE TO RELATED APPLICATIONS

This application is a continuation-in-part of copending application Ser. No. 07/424,888, filed Oct. 20, 1989 now abandoned, and of copending application Ser. No. 07/640,021, filed Jan. 10, 1991, which in turn is a continuation of application Ser. No. 07/424,543, filed Oct. 20, 1989 now abandoned.

FIELD OF THE INVENTION

This invention relates to improved thermoplastic molding compositions and, more particularly, to improved thermoplastic copolyether esters and/or copolyetherimide esters combined with high molecular weight polyester resins into molding compositions comprising from 20-85% by weight of total composition of a filler, such as zinc oxide, barium sulfate, and the like.

BACKGROUND OF THE INVENTION

Highly filled, dense, thermoplastic based compositions which have ceramic-like properties are desirable because they may be used in applications usually reserved for ceramics or filled thermosets. This is because of the relative ease with which thermoplastics may be fabricated. In the above-mentioned copending applications, one of the applicants in this commonly assigned application has reported that certain polymers may be combined with exceptionally high levels of inorganic fillers to result in molding compositions which are capable of being molded into articles having ceramic-like properties. These polymers are selected from the group consisting of polycarbonates, polyetherimides and copolymers thereof, polycyclonehexyldimethylene terephthalates and copolymers thereof, polypropylene and polybutylene terephthalates and copolymers thereof, polyethylene terephthalates and copolymers thereof, polyimides, polyester carbonates, polyphenylene sulfides, polyamides, polyamideimides, polyarylates, polymethylpentenes, polysulfones, polyether sulfones, polystyrenes, rubber modified high impact polystyrenes, acetals, SAN, SMA, ASA, modified polyphenylene ethers, polyether ketones, ABS, PVC, PFA, ECTFE, ETFE, PVDF, liquid crystal polymers and combinations thereof. Such thermoplastics, and mixtures of any of them are combined with 30%-80% by weight of a filler selected from zinc oxide or barium sulfate, zirconium oxide, zirconium silicate or mixtures of any of them. In one of the copending applications, it is disclosed that useful such compositions are also provided with an even broader range of filler content, e.g., 20%-90%, if careful attention is paid to the flexural strength of the resulting molded articles—the maximum permissible flexural strength being 7500 psi when measured in standard ASTM Test Methods. Both copending applications specifically exemplify compositions comprising copolyetherimide ester resins, poly(1,4-butylene terephthalate) and zinc oxide, as well as such compositions including also polycarbonate resin.

It has now been discovered that many new polymer blends comprising copolyetherester resins, copolyetherimide ester resins, or mixtures thereof and linear and/or branched polyesters having high loadings of the mineral fillers over a broad resin composition range will surprisingly provide highly dense, readily processible compositions having high impact strength. Addition of the copolymers in combination with the such polyesters is also found to provide desirably lower Shore hardness, improved dynamic fatigue properties, paintability, extrudability and injection moldability. The new compositions can also contain reinforcing fillers and/or flame retardant agents.

The new compositions may be used to mold useful objects such as tableware, dishes, bowls, mugs, plumbing fixtures and the like which require a smooth surface. In addition, the selection of the proper level of filler will provide a density in the molded article which approaches the density of ceramics, e.g., 2.0 to 2.5 g/cc.

Accordingly, it is an object of this invention to provide novel molding compositions which contain a high level of fillers which will provide a smooth surface.

It is also an object of this invention to provide novel molding compositions which have a high level of fillers which will have a ceramic-like feel and density.

It is also an object of this invention to provide novel molding compositions having special utility for making molded articles.

It is also an object of this invention to provide novel molding compositions which may be employed for making highly dense molded articles.

These and other objects of the invention will become apparent from the present specification.

SUMMARY OF THE INVENTION

According to this invention, in one of its major aspects, there are provided thermoplastic resin compositions comprising:

A. from about 80 to about 15 parts by weight of a resinous composition comprising a combination of:
(a) a copolyetherester resin;
(b) a copolyetherimide ester resin; or
(c) a mixture of (a) and (b); and
(d) a high molecular weight polyester resin or a mixture of such resins, and, correspondingly, B. from about 20 to about 85 parts by weight of:
(a) a filler selected from zinc oxide, barium sulfate, zirconium oxide, zirconium silicate or strontium sulfate; or
(b) a mixture of any of such fillers.

In preferred embodiments there are provided compositions as defined above wherein wherein filler B comprises from 30 to 75 parts by weight of zinc oxide; filler B comprises from 30 to 75 parts by weight of barium sulfate; filler B comprises from 30 to 75 parts by weight of zirconium oxide; filler B comprises from 30 to 75 parts by weight of zirconium silicate; or filler B comprises from 30 to 75 parts by weight of strontium sulfate. Also preferred are such compositions wherein Component A(a) comprises a copolyether ester resin; those wherein Component A(b) comprises a copolyetherimide ester resin, especially those wherein said copolyetherimide ester resin (b) comprises units derived from (i) at least one low molecular weight diol, (ii) at least one dicarboxylic acid or chemical equivalent thereof, and (iii) a set of reactants selected from (a)(1) at least one high molecular weight poly(oxyalkylene)diamine and (2) at least one tricarboxylic acid or a derivative thereof, or (b) at least one high molecular weight polyalkylene diimide diacid; or a mixture of such resins, special mention being made of those wherein the diol component comprises 60 to 100 mole percent 1,4-butanediol; those wherein the dicarboxylic acid component comprises from 60 to 100 percent of dimethyl terephthalate; those wherein the polyoxyalkylene diimide diacid component is derived from one or more polyoxyalkylene diamines and one or more tricarboxylic acid compounds containing two vicinal carboxyl groups or an anhydride group and an additional carboxyl group, and is characterized by the following formula:

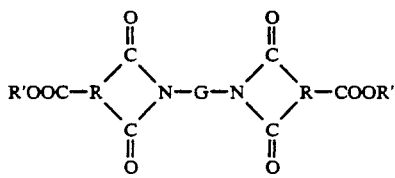

wherein each R is independently selected from the group consisting of $C_2$ to $C_{20}$ aliphatic and cycloaliphatic trivalent organic radicals and $C_6$ to $C_{20}$ aromatic trivalent organic radicals; each R' is independently selected from the group consisting of hydrogen, $C_1$ to $C_6$ aliphatic and cycloaliphatic monovalent organic radicals and $C_6$ to $C_{12}$ aromatic monovalent organic radicals, and G is the radical remaining after removal of the hydroxy groups of a long chain ether glycol having an average molecular weight of from about 600 to 12,000; and those wherein the polyoxyalkylene diimide diacid is derived from trimellitic anhydride and a polyoxyalkylene diamine selected from the group consisting of polypropylene oxide diamine and a copoly(ethylene oxide-propylene oxide)diamine having predominately polyethylene oxide in the backbone.

Amoung the preferred features of the invention are compositions as defined above wherein component (d) comprises a polyester of the formula:

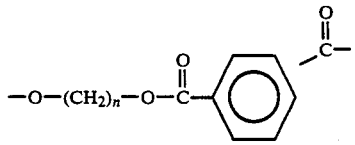

wherein n represents a whole number between about 2 and about 12; those wherein said polyester comprises poly(1,4-butylene terephthalate); those wherein said polyester comprises poly(ethylene terephthalate); and those wherein said polyester comprises a mixture of poly(1,4-butylene terephthalate) and poly(ethylene terephthalate).

In a further major aspect, the present invention contemplates thermoplastic resin compositions as defined above wherein filler B comprises from 30 to 75 parts by weight; those which also include an external lubricant; and those which also include an antioxidant.

Special mention is made of a molding composition as defined above which consists essentially of:

A. from 70 to 25 parts by weight of the copolyether ester, the copolyetherimide ester or mixture thereof and the polyester resin, and, correspondingly, B. from 30 to 75 parts by weight of a filler selected from the group consisting of zinc oxide, barium sulfate and a mixture thereof.

Special mention is also made of compositions as defined under the preferred embodiments above wherein the weight ratio of (iii) to (ii) in the copolyetherimide ester is from about 0.002 to 0.20:1, more preferably, from about 0.005 to about 0.15:1, and, most preferably, from about 0.005 to 0.10:1.

The invention comtemplates both linear and branched polyester, copolyether, and copolyether imide resins, and the like.

Also contemplated by the invention are compositions as first defined above which also include an effective amount of:

C. a reinforcing agent;

D. a flame retardant agent, alone, or in further combination with a synergist; or E. a combination of C and D.

In its broadest aspects the invention also contemplates shaped articles comprising thermoplastic compositions as above defined.

DETAILED DESCRIPTION OF THE INVENTION

The high molecular weight polyesters A(d) used in the practice of the present invention include polymeric glycol esters of terephthalic acid and isophthalic acids. They are available commercially or can be prepared by known techniques. See, for example, U.S. Pat. Nos. 2,465,319 and 3,047,539.

The glycol portion of the polyester contains from two to twelve, preferably two to four, carbon atoms in the form of linear methylene chains.

The most preferred polyesters will be high molecular weight polymeric glycol terephthalates or isophthalates having repeating units of the general formula:

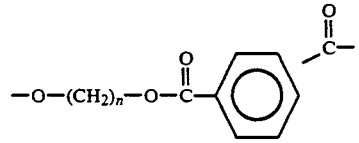

wherein n is 2, 3, or 4, and mixtures of such esters, including copolyesters of terephthalic and isophthalic acids of up to about 30 mole percent isophthalic acid units.

Especially preferred polyesters are poly(ethylene terephthalate) and poly(1,4-butylene terephthalate) and mixtures thereof.

Illustratively, high molecular weight polyesters will have an intrinsic viscosity of at least about 0.4 deciliters/gram and, preferably, at least 0.7 deciliters/gram as measured in a 60:40 phenol tetrachloroethane mixture at 30° C. At intrinsic viscosities of at least about 1.1 deciliters/gram, there is a further enhancement in toughness of the present compositions.

Suitable copolyetherester and copolyetherimide ester resins A(a) and A(b) include both random and block copolymers. They include also polyester hard block, polyester soft block-modified thermoplastic elastomers. In general these are prepared by conventional esterification/polycondensation processes from (a) one or more diols, (b) one or more dicarboxylic acids, (c) one or more long chain ether glycols, and/or a diamino terminated derivative thereof and optionally, one or more caprolactones or polycaprolactones. In addition to being commercially available, the copolyether esters are described in U.S. Pat. Nos. 3,023,192; 3,651,014; 3,763,109; 3,766,146; 3,784,520; 3,801,547; 4,156,774; 4,264,761; 4,355,155; and 4,760,112. Suitable commercially-available copolyether esters include LOMOD ® resins, all products of GE Plastics; HYTREL ® thermoplastic elastomer resins, products of DuPont Company; RITEFLEX® resin, a product of Celanese Company; ARNITEL® resin, a product of AKZO Company; PELPRENE® resin, a product of TOYOBO Company, as well as others.

Suitable copolyetherimide esters A(b) for use in the present invention are prepared by methods described by McCready et al in U.S. Pat. Nos. 4,556,688, 4,556,705 and 4,760,112. Many are also comercially available, such as the LOMOD® resins of GE Plastics.

Suitable diols (i) for use in preparing the copolyetherester and copolyetherimide ester resins used in the present invention include saturated and unsaturated aliphatic and cycloaliphatic dihydroxy compounds as well as aromatic dihydroxy compounds. These diols are preferably of a low molecular weight, i.e. having a molecular weight of about 250 or less. When used herein, the term "diols" and "low molecular weight diols" should be construed to include equivalent ester forming derivatives thereof, provided, however, that the molecular weight requirement pertains to the diol only and not to its derivatives. Exemplary of ester forming derivatives there may be given the acetates of the diols as well as for example ethylene oxide or ethylene carbonate for ethylene glycol.

Preferred saturated and unsaturated aliphatic and cycloaliphatic diols are those having from 2 to about 15 carbon atoms. Exemplary of these diols there may be given ethylene glycol, propanediol, butanediol, pentanediol, 2-methyl propanediol, 2,2-dimethyl propanediol, hexanediol, decanediol, 1,2-, 1,3-, and 1,4-cyclohexane dimethanol, butenediol, hexenediol, etc. Especially preferred are 1,4-butanediol, and mixtures thereof with hexanediol, 1,4-cyclohexane dimethanol, or butenediol, most preferably 1,4-butanediol.

Aromatic diols suitable for use in preparing resins for the practice of the present invention are generally those having from 6 to about 15 carbon atoms. Included among the aromatic dihydroxy compounds are resorcinol, hydroquinone, 1,5-dihydroxy naphthalene, 4,4'-dihydroxy naphthalene, 4,4'-dihydroxy diphenyl, bis-(p-hydroxy phenyl)methane and bis(p-hydroxy phenyl)-2,2-propane.

Especially preferred diols are the saturated aliphatic diols, mixtures thereof and mixtures of saturated diol(s) with unsaturated diol(s), wherein each diol contains from 2 to about 8 carbon atoms. Where more than one diol is employed, it is preferred that at least about 60 mole %, based on the total diol content, be the same diol, most preferably at least 80 mole %. As mentioned above, the preferred compositions are those in which 1,4-butanediol is present in a predominant amount, most preferably when 1,4-butanediol is the only diol.

Dicarboxylic acids (ii) which are suitable for use in preparing resins to practice of the present invention are aliphatic, cycloaliphatic and/or aromatic dicarboxylic acids. These acids are preferably of a low molecular weight, i.e., having a molecular weight of less than about 300. However, in some cases higher molecular weight dicarboxylic acids, may also be used. The term "dicarboxylic acids" as used herein, includes equivalents of dicarboxylic acids having two functional carboxyl groups which perform substantially like dicarboxylic acids in reaction with glycols and diols in forming polyester polymers. These equivalents include esters and ester-forming derivatives, such as acid halides and anhydrides. The molecular weight preference, mentioned above, pertains to the acid and not to its equivalent ester or ester-forming derivatives. Thus, an ester of a dicarboxylic acid having a molecular weight greater than about 300 or an acid equivalent of a dicarboxylic acid having a molecular weight greater than about 300 are included provided the acid has a molecular weight below about 300. Additionally, the dicarboxylic acids may contain any substituent group(s) or combinations which do not substantially interfere with the polymer formation and use of the polymer in this invention.

Aliphatic dicarboxylic acids, as the term is used herein, refer to carboxylic acids having two carboxyl groups each of which is attached to a saturated carbon atom on an isolated or fused benzene ring system. It is not necessary that both functional carboxyl groups be attached to the same aromatic ring and where more than one ring is present, they can be joined by aliphatic or aromatic divalent radicals such as —O—or —SO$_2$—.

Representative aliphatic and cycloaliphatic acids which can be used to prepare resins for this invention are sebacic acid, 1,2-cyclohexane dicarboxylic acid, 1,3-cyclohexane dicarboxylic acid, adipic acid, glutaric acid, succinic acid, oxalic acid, dimer acid, 4-cyclohexene-1,2-dicarboxylic acid, 2-ethylsuberic acid, tetramethylsuccinic acid, cyclopentanedicarboxylic acid, decahydro-1,5-naphthalene dicarboxylic acid, 4,4'-bicyclohexyl dicarboxylic acid, decahydro-2,6-naphthalene dicarboxylic acid, 4,4-methylenebis(cyclohexane carboxylic acid), 3,4-furan dicarboxylic acid and 1,1-cyclobutane dicarboxylic acid. Preferred aliphatic acids are cyclohexane dicarboxylic acids, sebacic acid, glutaric acid and adipic acid.

Representative aromatic dicarboxylic acids which can be used include terephthalic, phthalic and isophthalic acids, bi-benzoic acid, substituted dicarboxy compounds with two benzene nuclei such as bis(p-carboxyphenyl)methane, oxybis(benzoic acid), ethylene-1,2-bis(p-oxybenzoic acid), 1,5-naphthalene dicarboxylic acid, 2,6-naphthalene di-carboxylic acid, 2,7-naphthalene dicarboxylic acid, phenanthrene dicarboxylic acid, anthracine dicarboxylic acid, 4,4'-sulfonyl dibenzoic acid, and halo and C1–C12 alkyl, alkoxy, and aryl ring substituted derivatives thereof. Hydroxy acids such as p-(beta-hydroxyethoxy)benzoic acid can also be used provided an aromatic dicarboxylic acid is also present.

Preferred dicarboxylic acids for the preparation of the copolyether esters and copolyetherimide esters used in the present invention are the aromatic dicarboxylic acids, mixtures thereof and mixtures of one or more dicarboxylic acids with an aliphatic or cycloaliphatic dicarboxylic acid, most preferably the aromatic dicarboxylic acids. Among the aromatic acids, those with 8–16 carbon atoms are preferred, particularly the benzene dicarboxylic acids, i.e., phthalic, terephthalic and isophthalic acids and their dimethyl derivatives. Especially preferred is dimethyl terephthalate.

Finally, where mixtures of dicarboxylic acids are employed in resins used to practice of the present invention, it is preferred that at least about 60 mole %, preferably at least about 80 mole %, based on 100 mole % of dicarboxylic acid (b) be of the same dicarboxylic acid or ester derivative thereof. As mentioned above, the preferred compositions are those in which dimethyl terephthalate is the predominant dicarboxylic acid, most preferably when dimethyl terephthalate is the only dicarboxylic acid.

The copolyetherimide ester polymers of the present invention may be prepared by a one-pot synthesis involving the reaction of the diol (i), the dicarboxylic acid (ii), the high molecular weight poly(oxyalkylene)diamine (iii)(a)(1), and the tricarboxylic acid or its derivative (iii)(a)(2). In such a synthesis the polyoxyalkylene diimide diacid (iii)(b) is formed in-situ by the reaction of the poly(oxyalkylene)diamine with the dicarboxylic acid. The poly(oxyalkylene)diamines (iii)(a)(1) suitable for use in the present invention may be represented by the following general formula

wherein G is the radical remaining after the removal of the amino groups of a long chain alkylene ether diamine. These polyether diprimary diamines are available commercially from Texaco Chemical Company under the trademark JEFFAMINE ®. In general, they are prepared by known processes for the amination of glycols. For example, they may be prepared by aminating the glycol in the presence of ammonia, Raney nickel catalyst and hydrogen as set forth on Belgium Pat. No. 34,741. Alternately, they may be prepared by treating glycol with ammonia and hydrogen over a Nickel-Copper-Chromium catalyst as taught by U.S. Pat. Nos. 3,155,728 and 3,236,895 and French Patent Nos. 1,551,605 and 1,466,708.

The long chain ether diamines suitable for use herein are the polymeric diamines having terminal (or as nearly terminal as possible) amine groups and an average molecular weight of from about 600 to about 12,000 preferably from about 900 to about 4,000. Additionally, the long chain ether diamines will generally have a carbon-to-oxygen ratio of from about 1.8 to about 4.3.

Representative long chain ether diamines are the poly(alkylene ether)diamines including poly(ethylene ether)diamine, poly(propylene ether)diamine, poly(tetramethylene ether)diamine; random or block copolymers of ethylene oxide and propylene oxide including propylene oxide and poly(propylene oxide) terminated poly(ethylene ether)diamine; and aminated random or block copolymers of tetrahydrofuran with minor amounts of a second monomer such as ethylene oxide, propylene oxide, and methyl tetrahydrofuran (used in proportions such that the carbon-to-oxygen mole ratio in the diamine does not exceed about 4.3 to 1). Polyformyl diamines prepared by reacting formaldehyde with diols such as 1,4-butanediol and 1,5-pentanediol and subsequent amination are useful. Especially preferred poly(alkylene ether) diamines are poly(propylene ether)diamine, poly(tetramethylene ether)diamine, and the poly(ethylene ether)glycols which are end-capped with polypropylene ether) and/or propylene oxide and subsequently aminated.

In general, the polyoxyalkylene diamines useful in the copolyetherimide esters used in the present invention have an average molecular weight of from about 600 to about 12,000, preferably from about 900 to about 4,000.

The tricarboxylic acid (iii)(a)(2) may be almost any carboxylic acid anhydride containing an additional carboxylic group or the corresponding acid thereof containing two imide-forming vicinal carboxyl groups in lieu of the anhydride group. Mixtures thereof are also suitable. The additional carboxylic group must be esterifiable.

While trimellitic anhydride is preferred as the tricarboxylic acid component, any number of suitable tricarboxylic acid constituents will occur to those skilled in the art including 2,6,7-naphthalene tricarboxylic anhydride, 3,3',4-diphenyl tricarboxylic anhydride, 3,3',4-benzophenone tricarboxylic anhydride, 1,3,4-cyclopentane tricarboxylic anhydride, 2,2',3-diphenyl tricarboxylic anhydride, diphenyl sulfone-3,3',4-tricarboxylic anhydride, ethylene tricarboxylic anhydride, 1,2,5-naphthalene tricarboxylic anhydride, 1,2,4-butane tricarboxylic anhydride, and 1,3,4-cyclohexane tricarboxylic anhydride. These tricarboxylic acid materials can be characterized by the following general formula

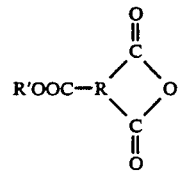

wherein:
R is a trivalent organic radical, preferably a $C_2$–$C_{20}$ aliphatic or cycloaliphatic, or $C_6$–$C_{20}$ aromatic trivalent radical;
R' is preferably hydrogen or a monovalent organic radical preferably selected from $C_1$–$C_6$ aliphatic and/or cycloaliphatic radicals and $C_6$–$C_{12}$ aromatic radicals, e.g., benzyl, most preferably hydrogen.

In the preparation of the instant polyetherimide ester polymers sufficient amounts of diol versus dicarboxylic acid, and tricarboxylic acid versus diamine must be present, as recognized in the art, to allow for substantially complete polymerization.

This type of one-pot reaction involving the reactions of (i) a diol component, (ii) a dicarboxylic acid component, (iii)(a)(1) a poly(oxyalkylene)diamine component, and (iii)(a)(2) a tricarboxylic acid component is described in U.S. Pat. No. 4,556,688 to McCready et al. In this type of one-pot reaction the amount of diol (i) employed will be, in general, a molar excess, preferably about 1.5 molar equivalents, based on the combined molar equivalents of dicarboxylic acid (ii) and of the total moles of the tricarboxylic acid (iii)(a)(2). The amount of the tricarboxylic acid employed will preferably be about two molar equivalents based on the number of moles of the poly(oxyalkylene)diamine. Obviously, less than two molar equivalents would result in incomplete imidization of the diamine resulting in potentially poorer properties. Conversely, greater than two molar equivalents of the tricarboxylic acid may lead to cross-linking and/or branching of the polymer. Generally, mole ratios of 2 moles tricarboxylic acid to 0.85 to 1.15 moles of poly(oxyalkylene diamine) yield useful polymers.

The amount by which the diamine (iii)(a)(1) and the dicarboxylic acid (ii) are used in the present invention is important if polyetherimide ester polymers are desired which exhibit high flexural modulus and, therefore, greater stiffness, as well as improved solvent resistance. It is to be understood, however that such amounts are preferred but not critical, especially if low modulus is the desired property. For the so-called hard segmented embodiments, the amounts of the poly(oxyalkylene)diamine and dicarboxylic acid or its derivatives used must be such that the weight ratio of the theoretical amount of the polyoxyalkylene diimide diacid, formable from the poly(oxyalkylene)diamine and the tricarboxylic acid, to the dicarboxylic acid is from about 0.05 to 3.0:1, preferably from about 0.1 to about 2.5:1, and more preferably from about 0.02 to about 2.0:1. If this weight ratio is exceeded, i.e., is greater than 0.20:1, the flexural modulus will be adversely affected. That is to say, the flexural modulus will be lowered and might begin to approach that of the conventional polyetherimide esters, with a concomitant loss of stiffness. The solvent resistance of the instant copolyetherimide esters might also be adversely affected.

The instant copolyetherimide esters may also be prepared by a two-pot synthesis involving the reaction of the diol(i), the dicarboxylic acid (ii), and the polyoxyalkylene diimide diacid (iii)(b). Such a reaction is described in U.S. Pat. No. 4,556,705 to McCready. Basically, in this process the poly(oxyalkylene)diamine is reacted with the tricarboxylic acid to form a polyoxyalkylene diimide diacid, and the preformed polyoxylakylene diimide diacid is then reacted with the diol and the dicarboxylic acid to form the copolyetherimide ester polymers.

The polyoxyalkylene diimide diacid (iii)(b) may be represented by the general formula

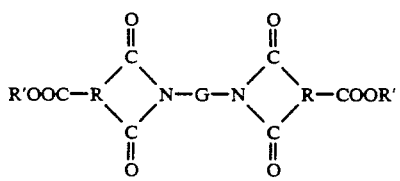

wherein G, R, and R' are as defined hereinabove.

The polyoxyalkylene diimide diacids of this formula suitable for use herein are high molecular weight diimide diacids having an average molecular weight greater than about 700, preferably greater than about 900. They may be prepared by the imidization reaction of one or more tricarboxylic acids (iii)(a)(2) containing two vicinal carboxyl groups or an anhydride group and an additional carboxyl group which must be esterifiable with the high molecular weight poly(oxyalkylene)diamine (iii)(a)(1). These polyoxyalkylene diimide diacids and processes for their preparation are disclosed on U.S. Pat. No. 4,556,705. Briefly, these polyoxylakylene diimide diacids may be prepared by known imidization, including melt synthesis, or by synthesizing in a solvent system. Such reactions will generally occur at temperatures from about 100 degrees C. to about 300 degrees C., preferably at temperatures from about 150 degrees C. to about 250 degrees C., while drawing off water or in a solvent system at the reflux temperature of the solvent or azeotropic (solvent) mixture.

In this two-pot process, as in the one-pot process described hereinabove, it is generally preferred that the diol be present in at least a molar equivalent amount, preferably a molar excess, most preferably at least 150 mole % based on the moles of dicarboxylic acid and polyoxylakylene diimide diacid combined. Such molar excess of diol will generally allow for optimal yields, based on the amount of acids, while accounting for the loss of diol during esterification.

In this two-pot process the amount of the polyoxyalkylene diimide diacid and dicarboxylic acid utilized is critical in providing those preferred copolyetherimide esters exhibiting high flexural modulus, and also improved solvent resistance. The amount of the polyoxyalkylene diimide diacid used in any such case is such that the weight ratio of the polyoxyalkylene diimide diacid to the dicarboxylic acid is from about 0.05 to 3.0:1, preferably from about 0.01 to about 2.5:1, and more preferably from about 0.20 to about 2.0:1. Within this ratio the polymers exhibit high flexural modulus and also improved organic solvent resistance, i.e., they exhibit improved stiffness. If the weight ratio maximum of 3.0 is exceeded the flexular modulus of the polymers is lowered. Also the solvent resistance of these polymers is reduced, as explained above.

It is also possible, as described in U.S. Pat. No. 4,556,688, to prepolymerize the aromatic dicarboxylic acid and the diol to form a prepolyester, and then react this prepolyester with either the diimide diacid or with the tricarboxylic acid and the poly(oxyalkylene)diamine. Forming the prepolyester can be achieved by conventional esterification techniques such as those described in U.S. Pat. Nos. 2,465,319 and 2,910,466.

In its preferred embodiments, the copolyetherimide esters used in the invention will comprise the reaction products of dimethyl terephthalate, optionally with up to 40 mole % of another dicarboxylic acid; butanediol, optionally with another diol such as butenediol, hexanediol, or cyclohexane dimethanol; and either a poly(oxyalkylene)diamine having an average molecular weight of from about 600 to about 12,000, preferably from about 900 to about 4,000, and trimellitic anhydride, or a polyoxyalkylene diimide diacid. For reasons explained above in certain instances the weight ratio of the polyoxyalkylene diimide diacid to the dicarboxylic acid will be from about 0.05 to 3.0:1, preferably from about 0.10 to about 2.5:1, and more preferably from about 0.20 to about 2.0:1. In its more preferred embodiments the diol will be butanediol and the dicarboxylic acid will be 100 mole percent dimethyl terephthalate, and, in the special instances mentioned above, the weight ratio of the polyoxyalkylene diimide diacid to dicarboxylic acid will be from about 0.05 to 3.0:1, preferably from about 0.20 to about 2.5:1, and more preferably from about 0.20 to about 2.0:1.

In the process, particularly where all of the reactants are charged to the reactor together or where the polyoxyalkylene diimide diacid is preformed and excess tricarboxylic acid is present, a minor amount of the tricarboxylic acid or anhydride may react with available hydroxyl groups and ultimately function as a branching agent in the finished polymer. Within limits, the degree of branching in the finished polymer can be controlled by varying the mole ratio of tricarboxylic acid to poly(oxyalkylene)diamine. An excess of diamine reduces the degree of branching, while an excess of the tricarboxylic acid increases branching. In addition to controlling branching by varying the tricarboxylic acid/diamine mole ratio, one can compensate for branching by introducing a mono-functional reactant such as benzoic acid in minor amounts.

With reference to branching, it should be noted that polymers used in this invention, when prepared from preformed diimide diacid, are substantially free of branching. If branching is desired, one needs only to introduce a branching agent, such as trimellitic anhydride, along with the preformed diimide diacid. The amount of branching agent generally will be less than 0.15 moles per mole of diimide diacid. Useful branching agents other than trimellitic anhydride include trimethyl trimellitate, glycerol, trimethylol propane, trimesic acid and its esters and the like.

The copolyether esters and the copolyetherimide esters may be prepared by conventional esterification/condensation reactions for the production of polyesters. These processes are described, inter alia, in U.S. Pat.

Nos. 3,763,109; 3,651,014; and 3,801,547, and in U.S. Pat. Nos. 4,556,705 and 4,556,688.

The polyetherimide esters used in the invention contain at least the following two recurring structural units:

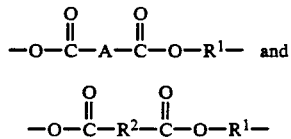

wherein:
A is the residue of the polyoxyalkylene diimide diacid absent the two carboxyl groups, i.e.,

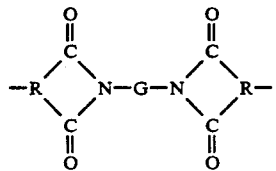

$R^1$ is the residue of the diol absent the two hydroxy groups; and
$R^2$ is the residue of the dicarboxylic acid absent the two carboxyl groups.

The amounts of the recurring structural units present in the above-mentioned family of preferred resins are generally such that the ratio, by weight, of recurring structural units of the first type to recurring structural units of the second type is from about 0.05 to 3.0:1, preferably from about 0.1 to about 2.5:1, and more preferably from about 0.02 to about 3.0:1.

Additionally, while not required, it is customary and preferred to utilize a catalyst in the process for the production of the copolyether esters and copolyetherimide imide esters used in the invention. In general, any of the known ester-interchange and polycondensation catalysts may be used. Although two separate catalysts or catalyst systems may be used, one for ester interchange and one for polycondensation, it is preferred, where appropriate, to use one catalyst or catalyst system for both. In those instances where two separate catalysts are used, it is preferred and advantageous to render the ester-interchange catalyst ineffective following the completion of the precondensation reaction by means of known catalyst inhibitors or quenchers, in particular, phosphorus compounds such as phosphoric acid, phosphorous acid, phosphenic acid, phosphonic acid and the alkyl or aryl esters or salts thereof, in order to increase the thermal stability of the resultant polymer.

Exemplary of the suitable known catalysts there may be given the acetates, carboxylates, hydroxides, oxides, alcoholates or organic complex compounds of zinc, manganese, antimony, cobalt, lead, calcium and the alkali metals insofar as these compounds are soluble in the reaction mixture. Specific examples include zinc acetate, calcium acetate and combinations thereof with antimony tri-oxide and the like. These catalysts as well as additional useful catalysts are described in U.S. Pat. Nos. 2,465,319; 2,850,483; 2,892,871; 2,937,160; 2,998,412; 3,047,539; 3,110,693; and 3,385,830.

Where the reactants and reactions allow, it is preferred to use the titanium catalysts including the inorganic and organic titanium containing catalysts, such as those described in, for example, U.S. Pat. Nos. 2,720,502; 2,727,881; 2,729,619; 2,822,348; 2,906,737; 3,047,515; 3,056,817; 3,056,818; and 3,076,952 among others. Especially preferred are the organic titanates such as tetra-butyl titanate, tetra-isopropyl titanate and tetra-octyl titanate and the complex titanates derived from alkali or alkaline earth metal alkoxides and titanate esters, most preferably the organic titanates. These too may be used alone or in combination with other catalysts such as for example, zinc acetate, manganese acetate or antimony trioxide, and/or with a catalyst quencher as described above. The catalyst is used in catalytic amounts, e.g., from about 0.005 to about 2 percent by weight based on total weight of reactants.

Both batch and continuous methods can be used for any stage of the ether ester and/or etherimide ester polymer preparation. Polycondensation of the polyester propolymer with the polyoxyalkylene diimide diacid can also be accomplished in the solid phase by heating finely divided solid polyester prepolymer with the diimide diacid in a vacuum or in a stream of inert gas to remove liberated low molecular weight diol. This method has the advantage of reducing degradation because it must be used at temperatures below the softening point of the prepolymer.

Although the copolyether ester and/or copolyetherimide esters used in this invention possess good resistance toward heat aging and photodegradation, it is advisable to stabilize these compounds by the addition of an antioxidant.

Many of the oxidative and/or thermal stabilizers known in the art for copolyesters may be used in the practice of the present invention. These may be incorporated into the composition either during polymerization or while in a hot melt stage following polymerization. Satisfactory stabilizers include the phenols and their derivatives, amines and their derivatives, compounds containing both hydroxyl and amine groups, hydroxyazines, oximes, polymeric phenolic esters and salts of multivalent metals in which the metal is in its lower valence state. Some specific examples of these stabilizers are described in U.S, Pat. No. 4,556,688.

The polymers used on the compositions of this invention may be stabilized against ultraviolet radiation by the addition thereto of the well known ultra violet radiation absorbers such as, for example, the benzophenones, benzotriazoles, and cyanoacrylates.

With respect to the fillers B, the zinc oxide may be in the form of zincite or as synthetically produced white zinc oxide produced by the indirect French process using zinc metal or metallic residues or the American process using zinc residues or by a wet chemical process. A finely divided form is preferred which has an average particle diameter of 0.05-50 microns, preferably 0.1-5 microns and most preferably about 1.5 microns.

The barium sulfate may be in the form of naturally occuring barytes or as synthetically derived barium sulfate using well known synthetic techniques. The average particle size may vary from 0.1 to 50 microns, preferably from 1 to 15 microns, and most preferably 8 microns.

The zirconium oxide occurs as baddeleyite or it may be prepared using well known procedures. An average particle size in the range of 0.1 to 50 microns may be utilized. Zirconium silicates may be employed as zircon or as the synthetically derived material having an average particle size of 0.1–50 microns.

The strontium sulfate may be in the form of naturally occuring mineral or as synthetically derived strontium sulfate using well known procedures. An average particle size range of 0.1–50 microns may be utilized.

In most applications, the zinc oxide, barium sulfate, zirconium oxide, zirconium silicate, strontium sulfate or mixtures may be employed. Each of these materials or any two or more may be used in combination. In addition, in place of the individual or combinations of these fillers, up to 50% by weight of the total filler contents and more preferably 15% by weight may be replaced with an inorganic filler, such as alumina, amorphous silica, anhydrous aluminum silicate, barium ferrite, calcium carbonate, mica, feldspar, clays, such as kaolin, talc, magnesium oxide, magnesium silicate, nepheline syenite, phenolic resins, glass microspheres, wollastonite, titanium dioxide, ground quartz and the like.

The molding compositions may include a resin as specified above with from 20–85 % by weight, preferably 30–75% by weight or most preferably 30–45% by weight of total composition of filler component. For certain applications where a ceramic like product is desired, more than 50% or more preferably 60–85% by weight of total composition of filler component should be employed.

The external lubricants function as mold release agents and the particular material is not critical in these embodiments employing such lubricants. The external lubricants may include compounds having a long non-polar backbone such as a carbon chain of 12–60 carbons. Examples include fatty acids; various esters including fatty esters, wax esters, glycerol esters, glycol esters, fatty alcohol esters, fatty alcohols, fatty amides, metallic stearates; and waxes. Those materials are described in Modern Plastics Encyclopedia, 1988 Edition, p. 162.

The additive, pentaerythritol tetrastearate, may be a dispersing agent for the barium sulfate, zinc oxide, zirconium silicate or mixtures thereof in the base resin and will also function as an external lubricant or mold release agent.

Preferred antioxidants include phosphites, hindered phenols, secondary amines and the like, which may be added in effective amounts to retard oxidative degradation. The preferred antioxidant is tetrakis(methylene-3-(3',5'-di-tert-butyl-4-butyl-4-hydroxyphenyl)propionate)methane ("IRGANOX" 1010).

Flame retardants may be added in effective amounts for molding articles such as wastepaper baskets which should be flame retardant, Suitable flame retardant agents are disclosed in U.S. Pat. Nos. 4,785,592; 3,334,154; and 4,020,124.

The compositions may be prepared by tumble blending the powdered components, extruding the blend, chopping the extrudate and thereafter fabricating the composition using conventional procedures such as injection molding, blow molding, thermoforming and the like.

It is preferred to use a devolatilizing extruder although other types of mixing equipment may be employed.

When molding the compositions of the invention, the surface properties can be optimized by increasing the mold or melt temperature, e.g. a mold temperature of 120 degrees–240 degrees F. and melt temperature from 500 degrees–580 degrees F. may be of use for the resins specified above. The molecular weight of particular polymers may require different temperatures for optimum surface properties, but such adjustments are well within the knowledge of those skilled in this art.

If desired, fiberglass, as well as other fibrous reinforcing fillers may be added as well as pigments, ultraviolet stabilizers, metal additives for electromagnetic radiation shielding such as nicked coated graphite fibers, antistatic agents, coupling agents such as amino silanes and the like.

If a fiberglass reinforcing filler is used, a level of 1–45% by weight of the total composition may be used or more preferably 5–15%.

DESCRIPTION OF THE PREFERRED EMBODIMENTS

The following examples illustrate the compositions of the present invention. They are not to be construed to limit the claims in any manner whatsoever.

EXAMPLES 1 AND 2

Compositions having the following components are prepared by tumble blending the ingredients (parts by weight), extruding in a ⅞" PRODEX single screw extruder, with a melt temperature of 530° F. They are dried and molded on an 80 ton Van Dorn injection molding machine at a melt temperature of 520° F., and a mold temperature of 200° F. The properties, measured by ASTM D638, D790, D256, and D792, as appropriate, are summarized as follows:

TABLE 1

| Example | 1 | 2 |
|---|---|---|
| Ingredients (parts/wt) | | |
| Polyetherimide ester resin[a] | 10.0 | 20.0 |
| Polycarbonate resin[b] | 15.5 | — |
| Poly(1,4-butylene terephthalate) resin[c] | 37.5 | 44.4 |
| Zinc oxide (3 micron av. particle size[d]) | 36.9 | 35.5 |
| Antioxidant[e] | 0.1 | 0.1 |
| Zinc phosphate | 0.5 | — |
| Properties | | |
| Tensile Strength, psi | 6640 | 5950 |
| Flexural modulus, psi | 359800 | 327200 |
| Flexural strength, psi | 11700 | 10070 |
| Izod Impact, notched, ft. lbs./in. | 1.0 | 0.6 |
| Izod Impact, unnotched, ft. lbs./in. | 23.4 | 9.6 |
| Specific Gravity, g/cc | 1.76 | 1.76 |

[a]"LOMOD" BO125, GE Plastics, Pittsfield MA 01201, U.S.A., flexural modulus 10,000 psi (Example 1); "LOMOD" BO525, flexural modulus 50,000 psi (Example 2)
[b]"LEXAN" 141 polycarbonate resin, GE Plastics, MI = 9.5 g/10 min per ASTM Test Method D1238
[c]"VALOX" 295 with an intrinsic viscosity of 0.78 dl/g at 25° C. in a 60:40 mixture of phenol and tetrachloroethane
[d]source was Zinc Corporation of America
[e]Ciba-Geigy-"IRGANOX 1010" antioxidant The foregoing results demonstrate that the addition of large amounts of zinc oxide to a polyetherimide ester/polybutylene terephthalate combination provides molded articles with surprisingly good properties.

EXAMPLES 3 TO 11

The general procedure of Examples 1 and 2 is used to prepare, mold and test compositions according to this invention comprising copolyetherimide esters and barium sulfate. The formulations used and the properties obtained are set forth in Table 2 as follows:

TABLE 2

Compositions Comprising Copolyetherimide Esters, Polybutylene Terephthalate and Barium Sulfate

| Example | 3 | 4 | 5 | 6 | 7 | 8 | 9 | 10 | 11 |
|---|---|---|---|---|---|---|---|---|---|
| Composition (pbw): | | | | | | | | | |
| Poly(1,4-butylene terephthalate) resin | 6.2$^a$ | 16.2$^a$ | 6.2$^a$ | 6.2$^a$ | 5.0$^a$ | 5.0$^b$ | 5.0$^a$ | 5.0$^a$ | 5.0$^a$ |
| Copolyetherimide ester resin | 30.0$^c$ | 20.2$^c$ | 30.0$^f$ | 30.0$^d$ | 24.2$^c$ | 24.2$^c$ | 24.5$^c$ | 24.2$^e$ | 24.2$^f$ |
| Barium sulfate | 63.0 | 63.0 | 63.0 | 63.0 | 70.0 | 70.0 | 70.0 | 70.0 | 70.0 |
| External lubricant | 0.3 | 0.3 | 0.3 | 0.3 | 0.3 | 0.5 | 0.15 | 0.3 | 0.3 |
| Antioxidant | 0.2 | 0.2 | 0.2 | 0.2 | 0.2 | 0.2 | 0.2 | 0.2 | 0.2 |
| Properties: | | | | | | | | | |
| Tensile Str, psi | 1915 | 3030 | 1570 | 1590 | 1825 | 1530 | 1950 | 1810 | 1345 |
| Tensile Elong, % | 34 | 18 | 62 | 37 | 23 | 28 | 23 | 24 | 44 |
| Flexural Mod, psi | 54080 | 164300 | 31500 | 38290 | 53020 | 48680 | 57970 | 48165 | 30080 |
| Flexural Str, psi | 2360 | 4910 | 1605 | 1325 | 2470 | 2260 | 2755 | 2260 | 1500 |
| Izod Imp, notch, ft-lb/in | 2.7 | 1.5 | 3.7 | 2.8 | NB | NB | NB | NB | NB |
| SpGr, g/cc | 2.16 | 2.21 | 2.14 | 2.17 | 2.37 | 2.37 | 2.39 | 2.33 | 2.30 |

$^a$"VALOX" 295, Poly(1,4-butylene terephthalate) resin, GE Plastics
$^b$"VALOX" 315, Poly(1,4-butylene terephthalate) resin, GE Plastics
$^c$Polybutylene terephthalate-co-polypropylene glycol imide, 10,000 psi flexural modulus
$^d$Polybutylene terephthalate-co-polypropylene glycol imide, 6,000 psi flexural modulus
$^e$Polybutylene terephthalate-co-polypropylene glycol imide-polytetramethylene glycol copolymer, 10,000 psi flexural modulus
$^f$Polybutylene terephthalate-co-polypropylene glycol imide-polytetramethylene glycol copolymer, 6,000 psi flexural modulus The patents, applications, publications and test methods mentioned above are incorporated herein by reference.

Many variations of the present invention will suggest themselves to those skilled in the art in light of the above detailed description. For example, small amounts of materials such as dyes, pigments, and plasticizers and the like can be added to the present compositions. Reinforcing glass fibers can be added in conventional amounts, e.g., 10, 20, and 30% by weight, based on resin content plus filler. Instead of glass, clay, talc, asbestos, wollastonite, and the like can be used as fillers. The compositions can be rendered flame retardant with conventional flame retarding agents, such as halogenated aromatic compounds like decabromodiphenyl ether, alone, or combined with synergists, such as antimony oxide. Instead of copolyetherimide esters, copolyether esters can be used. Copolyesters containing polyether imide and polyether segments can be employed. Also, the copolyetherimide ester resins disclosed in U.S. Pat. No. 4,760,112, and described above can be used. Instead of barium sulfate and zinc oxide, zirconium oxide, zirconium silicate, strontium sulfate, and obvious chemical equivalents can be used. All such obvious modifications are within intended scope of the claims.

We claim:

1. A thermoplastic resin composition consisting essentially of:
   A. from about 70 to about 25 parts by weight of a resinous composition consisting essentially of a combination of:
      (a) a copolyetherester resin;
      (b) a copolyetherimide ester resin; or
      (c) a mixture of (a) and (b); and
      (d) a polyester resin having an intrinsic viscosity of at least about 0.4 dl/g as measured in a 60:40 phenol tetrachloroethane mixture at 30° C. and, correspondingly,
   B. from 30 to 75 parts by weight of:
      (a) a filler selected from zinc oxide, barium sulfate, zirconium oxide, zirconium silicate or strontium sulfate; or
      (b) a mixture of any such fillers, wherein said filler B comprises from 30 to 75 parts by weight of zirconium silicate.

2. A thermoplastic resin composition consisting essentially of:
   A. from 70 to 25 parts by weight of a resinous composition comprising a combination of:
      (a) a copolyetherester resin;
      (b) a copolyetherimide ester resin; or
      (c) a mixture of (a) and (b); and
      (d) a polyester resin having an intrinsic viscosity of at least about 0.4 dl/g as measured in a 60:40 phenol tetrachloroethane mixture at 30° C., and, correspondingly,
   B. from 30 to 75 parts by weight of zirconium silicate.

3. A thermoplastic resin composition comprising:
   A. from about 80 to about 15 parts by weight of a resinous composition comprising a combination of:
      (a) a copolyetherester resin;
      (b) a copolyetherimide ester resin; or
      (c) a mixture of (a) and (b); and
      (d) a polyester resin having an intrinsic viscosity of at least about 0.4 dl/g as measured in a 60:40 phenol tetrachloroethane mixture at 30° C., and
   B. a filler comprising from 30 to 75 parts by weight of strontium sulfate.

* * * * *